United States Patent
Helle

(10) Patent No.: US 6,662,023 B1
(45) Date of Patent: Dec. 9, 2003

(54) METHOD AND APPARATUS FOR CONTROLLING AND SECURING MOBILE PHONES THAT ARE LOST, STOLEN OR MISUSED

(75) Inventor: Seppo Helle, Paimio (FI)

(73) Assignee: Nokia Mobile Phones Ltd., Espoo (FI)

( * ) Notice: Subject to any disclaimer, the term of this patent is extended or adjusted under 35 U.S.C. 154(b) by 505 days.

(21) Appl. No.: 09/610,769

(22) Filed: Jul. 6, 2000

(51) Int. Cl.[7] .............................. H04B 1/38; H04M 1/00
(52) U.S. Cl. ...................... 455/558; 455/411; 455/419
(58) Field of Search ................................ 455/410, 411, 455/418, 419, 558; 379/356.01, 357.01, 357.02

(56) References Cited

U.S. PATENT DOCUMENTS

| | | | |
|---|---|---|---|
| 5,231,375 A | 7/1993 | Sanders et al. ............. | 340/568 |
| 5,406,260 A | 4/1995 | Cummings et al. ......... | 340/568 |
| 5,675,321 A | 10/1997 | McBride ..................... | 340/568 |
| 5,898,783 A | * 4/1999 | Rohrbach .................... | 380/49 |
| 5,940,773 A | 8/1999 | Barvesten ................... | 455/558 |
| 5,987,609 A | * 11/1999 | Hasebe ........................ | 713/200 |
| 6,075,456 A | * 6/2000 | Park ........................ | 340/825.44 |
| 6,119,020 A | * 9/2000 | Miller et al. ................. | 455/558 |
| 6,128,511 A | * 10/2000 | Irie .............................. | 455/558 |
| 6,138,005 A | * 10/2000 | Park ............................ | 455/411 |

FOREIGN PATENT DOCUMENTS

| | | |
|---|---|---|
| WO | 9401843 | 1/1994 |
| WO | 9626510 | 8/1996 |
| WO | 9629638 | 9/1996 |
| WO | 0001180 | 1/2000 |

OTHER PUBLICATIONS

Patent Abstracts of Japan No. 09027087, Jan. 28, 1997 for Japanese Patent Appln 07–177259, Kumeuchi Kiyotaka, filed Jul. 13, 1995.

* cited by examiner

Primary Examiner—Vivian Chin
Assistant Examiner—Tuan Tran
(74) Attorney, Agent, or Firm—Ware, Fressola, Van Der Sluys & Adolphson LLP

(57) ABSTRACT

A method and apparatus is provided for controlling a mobile phone when it has been lost or stolen in order to prevent its use except to help the owner find it. Controlling the phone remotely may be implemented via a known Short Messaging System, for example. The security features provided are as follows: (1) Displaying contact information (phone number) of the owner on screen when the mobile phone can not start up normally, for example, due to an incorrect security code entry; (2) Setting the mobile phone in a secure state where it can only be used to call one number (Emergency calls are of course always possible.); and (3) Commanding the mobile phone to send information about its location and usage via SMS to a given number.

56 Claims, 3 Drawing Sheets

Phone is locked.
Call the owner
02654321

FIG. 3 : Phone locked display, PIN query cancelled.

Phone is locked.
Call the owner
02654321

Call

FIG. 4 : Phone locked display, SIM card available.

This phone is lost.
Please call
02654321

Call

FIG. 5 : Phone lost display

This phone is stolen.
Please call
02654321

Call

FIG. 6 : Phone stolen display.

METHOD AND APPARATUS FOR CONTROLLING AND SECURING MOBILE PHONES THAT ARE LOST, STOLEN OR MISUSED

BACKGROUND OF THE INVENTION

1. Field of Invention

The present invention relates to a mobile phone; and more particularly, to the security and control of a mobile phone that is lost, stolen, or misused.

2. Description of Related Art

Various security mechanisms for mobile phones exist:

A SIM card having a PIN code is known in the art. If a code query is active the SIM card cannot be used for calling.

Mobile phones also have security code features which prevent the use of the mobile phone, or restrict it (e.g. preventing the use of a phone number memory). When the feature is active, a code is asked at startup.

Another security measure is to use a keypad lock that can require a security code when opened. It is also possible to turn the keypad lock on automatically, for example, after a timeout when the mobile phone is not used.

However, the known anti-theft features do have disadvantages:

For example, if a phone has been lost with the power on, anyone can use it as long as it remains on. Only automatic locking when the mobile phone is not used prevents this.

Some security schemes load the user during daily use. When the user has to type in a security code each time the mobile phone powers on, or even each time when the keypad lock is opened, it can be seen as unnecessary work most of the time. The cases where a mobile phone gets lost are quite rare, after all.

There is no easy way for the person who has found a lost phone to contact the owner, especially if the mobile phone has some kind of lock preventing the use of it.

SUMMARY OF INVENTION

In summary, the present invention provides a method and apparatus for controlling a mobile electronics device, including a mobile phone or laptop computer, when it has been lost, stolen or misused in order to prevent its use except to help the owner find it. Controlling the mobile phone remotely may be achieved, for example, via a Short Messaging System (SMS). The security features are as follows:

1) Displaying contact information (phone number) of the owner on a display screen when the mobile phone does not start up normally, for example, due to an incorrect security code entry.
2) Setting the mobile phone in a secure mode where it can only be used to call one number. (Emergency calls are of course always possible.)
3) Commanding the mobile phone to send information about its location and usage via SMS to a given number.

In order to prevent unauthorized persons from misusing others' mobile phones, commands given remotely must contain a security code for the mobile phone. The security code is also needed to open a locked phone.

When the mobile phone can be set into a secure mode by remote control after it has actually been lost, some of the above-mentioned problems can be solved:

The mobile phone can be set into a locked mode by remote control, when it is still on.

The security code is not needed in daily use. (However, the PIN code query in the SIM card would still be needed in order to prevent the use of the SIM card in other phones.)

The mobile phone can be used to inform the owner about its location.

The method and apparatus of the present invention also complement and enhance the other security mechanisms already in use.

BRIEF DESCRIPTION OF THE DRAWING

The drawing includes the following:

FIG. 3 is a phone locked display message for displaying on the mobile phone shown in FIG. 1.

FIG. 4 is a phone locked display message for displaying on the mobile phone shown in FIG. 1.

FIG. 5 is a phone lost display message for displaying on the mobile phone shown in FIG. 1.

FIG. 6 is a phone stolen display message for displaying on the mobile phone shown in FIG. 1.

DETAILED DESCRIPTION OF INVENTION

Figure 1:
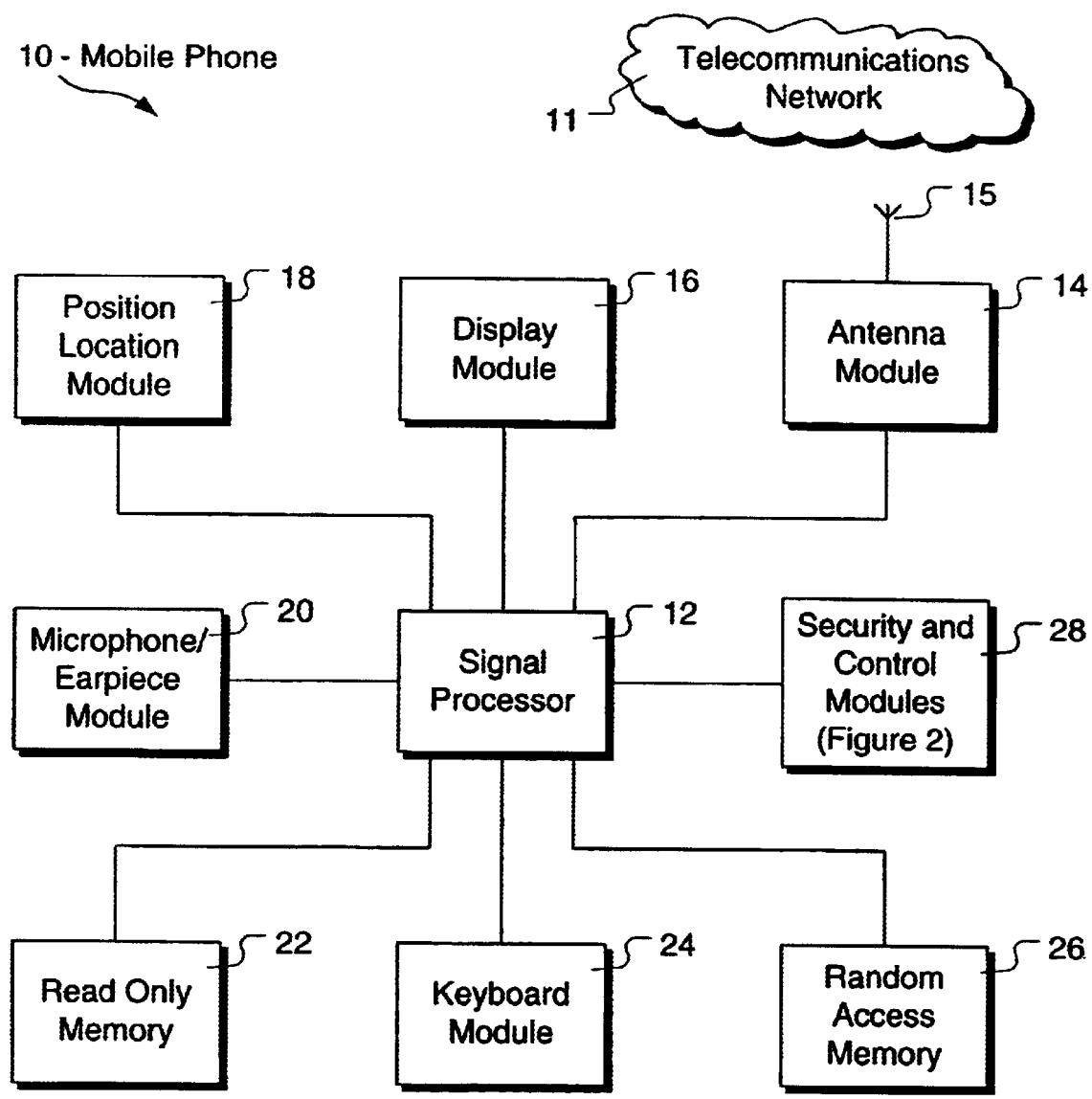
FIG. 1 is a block diagram of a mobile phone that is the subject matter of the present invention.

FIG. 1 shows the mobile phone generally indicated as 10 that is the subject matter of the patent application, for use in connection with a telecommunication network 11. The scope of the invention is also intended to cover other mobile electronic devices, such as a portable computer.

The mobile phone 10 includes a signal processor 12 connected to an antenna module 14 having an antenna 15, a display module 16, a position location module 18, a microphone/earpiece module 20, a read only memory 22, a keyboard module 24 and a random access memory 26, which are all known in the art. The operation of the signal processor 12 in relation to the aforementioned elements is also known in the art. Moreover, the scope of the invention is not intended to be limited to any particular kind or type of these elements.

The signal processor 12 is also connected to security and control modules 28. The whole thrust of the invention relates to the operation of the security and control modules 28 with respect to the security and control of the mobile phone 10, especially by remote control.

Figure 2:
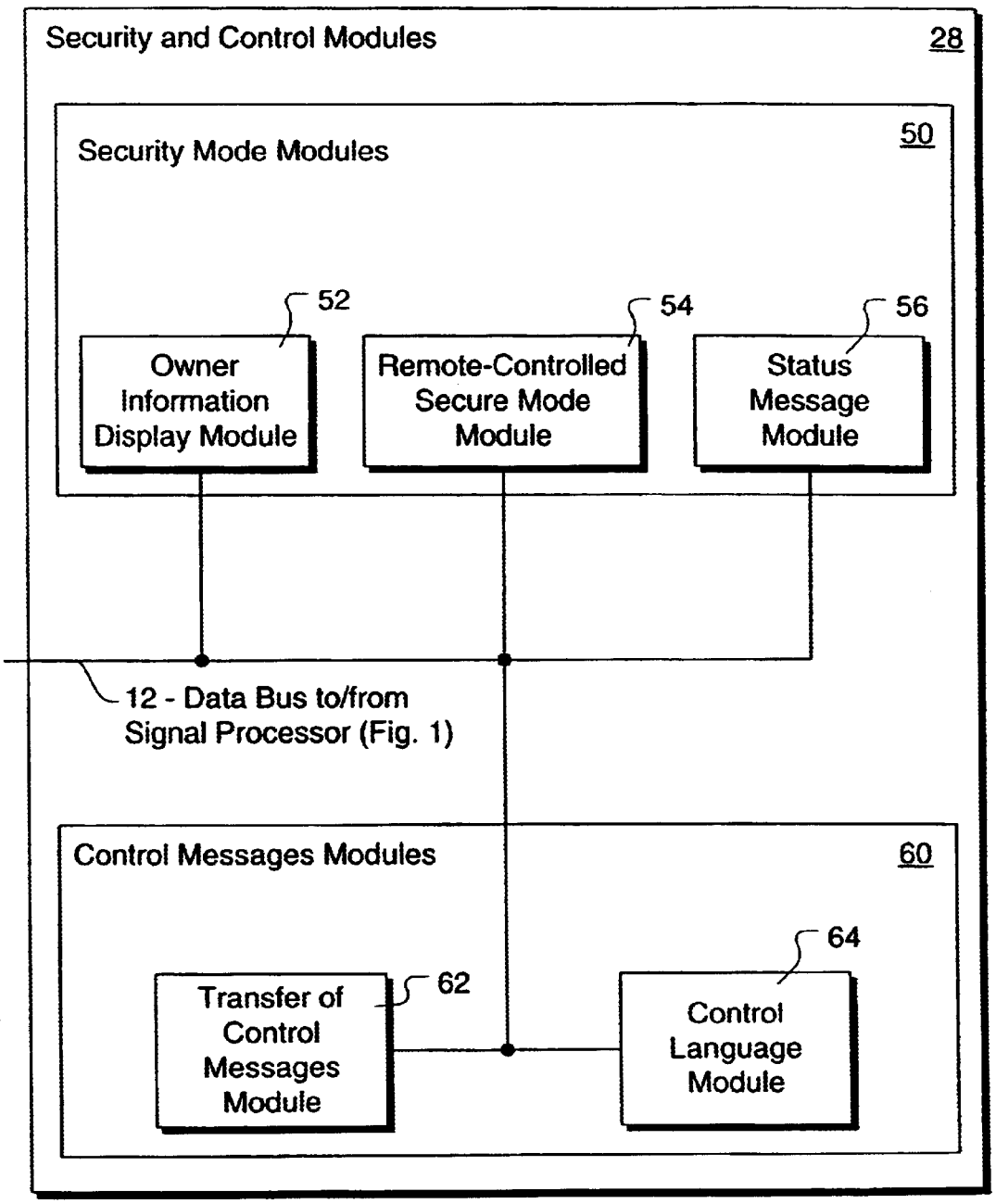
FIG. 2 is a block diagram of security and control modules of the mobile phone shown in FIG. 1.

FIG. 2 shows in detail the security and control modules 28, which will be described in relation to the various security and control applications set forth below.

SECURITY APPLICATIONS

The security and control modules 28 include an owner information display module 52, a remote-controlled secure mode module 54 and a status message module 56 which are discussed below.

Owner Information Display

In FIG. 2, the owner information display module 52 operates to enhance current security concepts by providing contact information of the owner of the mobile phone 10 (FIG. 1) for cases where the mobile phone 10 is found by someone else.

The random access memory 26 (FIG. 1) in the mobile phone 10 contains fields where the owner/user can store information (above all, a phone number other than the mobile number) about him/herself. The owner information is used to improve the existing security code concept as follows:

When the mobile phone 10 starts up, the SIM is checked first, and a PIN code query is displayed (if PIN query is "on"). In case the PIN is successfully entered and the SIM is an owner's SIM (known by the mobile phone), the mobile phone starts up and can be used normally.

The improvement of the present invention is that: if the PIN query is cancelled, the owner display module 52 displays on the display module 16 (FIG. 1) of the mobile phone 10 a phone locked message with owner information shown in FIG. 3.

In an alternative case, another SIM card which is not the owner's SIM may be put into the mobile phone 10, and if the PIN is entered correctly, then the mobile phone 10 requests a security code. If the security code is given correctly, everything proceeds as usual. But if the security code query is cancelled, or a wrong security code is given, the mobile phone 10 goes into a secure mode where the owner display module 52 displays on the display module 16 (FIG. 1) the information shown in FIG. 4.

In this case, the SIM has been successfully inserted in the mobile phone, so it is possible to make a call. However, the owner display module 52 of the mobile phone 10 only allows a call to the number displayed in the message. The call can be made easily via the softkey on the keyboard module 24.

The owner display module 52 disables any other use of the mobile phone 10 (except for emergency calls). This is called a Secure mode, which is discussed in more detail below.

The owner information display module 52 may be implemented using hardware, software or a combination thereof. A person skilled in the art would be able to implement the owner information display module 52 without undue experimentation.

Remote-controlled Secure Mode

In FIG. 2, the remote-controlled secure mode module 54 places the mobile phone 10 in a secure mode, which is a state where the usage of the mobile phone 10 is prohibited, except for emergency calls and calls to one other number.

The mobile phone 10 can go into the secure mode at startup, as described above in relation to the owner information display module section, or it can be switched into the secure mode by remote control, using a control message, while the mobile phone 10 is "on". The security code of the mobile phone 10 is always required in the control message to make it valid. (Below, in a section entitled Control Messages, the structure of control messages is discussed in more detail.)

For different situations the user can provide different control messages, and display different messages in these modes depending on whether the mobile phone 10 is purposely locked for any reason. The mobile phone is typically locked because it is lost or stolen, as follows:

Lock Phone

The remote-controlled secure mode module 54 locks the mobile phone 10 when the owner sends the control message with a lock phone instruction. The mobile phone 10 goes into a phone locked state or mode, and a phone locked display message shown in FIG. 4 is displayed by the display module 16 in FIG. 1. The owner number stored in memory 26 of the mobile phone is used in the phone locked display.

Phone Lost

The remote-controlled secure mode module 54 locks the mobile phone 10 when the owner sends the control message with a phone lost instruction. The remote-controlled secure mode module 54 locks the mobile phone and displays a phone lost display message shown in FIG. 5 on the display module 16 in FIG. 1. In this case, the mobile phone number to be displayed can be sent with the control message, so it can be any number the owner finds convenient at the moment. If a number is not sent, the number stored in the memory 26 of the mobile phone is used instead. If the mobile phone is switched off and after being put into a phone lost mode, the mobile phone starts up as described in the previous section, but if the (PIN and) security code is not entered correctly, the new contact number will be displayed instead of the previously stored one in the message, and phone lost text is used instead of the phone locked text.

Phone Stolen

The remote-controlled secure mode module 54 also locks the mobile phone 10 when the owner sends the control message with a phone stolen instruction. The remote-controlled secure mode module 54 will lock the mobile phone 10 and display a phone stolen display message shown in FIG. 6 on the display module 16 in FIG. 1. This phone state is identical with that of the phone lost message.

An example of a control language for implementing these instructions from the user/owner to the mobile phone 10 are discussed in more detail below.

The remote-controlled secure mode module 54 may be implemented using hardware, software or a combination thereof. A person skilled in the art would be able to implement the remote-controlled secure mode module 54 without undue experimentation.

Remote PIN Code

If the mobile phone 10 is lost, stolen or misplaced the user may also send via a telecommunication signal a remote PIN code command to his/her mobile phone 10 if the need for a PIN code has not already been activated by the user. The remote-controlled secure mode module 54 will performs functions to activate the need for a user to provide a PIN code in order to use the mobile phone 10.

Status Message

In FIG. 2, the status message module 56 allows the user to request information about the mobile phone's status by sending it the control message with such a request. The mobile phone 10 would return information, for example, via a Short Message System (SMS), to a number specified in the control message. The information could contain, for example, phone location data or last usage data.

The status message module 56 may be implemented using hardware, software or a combination thereof. A person skilled in the art would be able to implement the status message module 56 without undue experimentation.

Location Data

In order to send location data, the status message module 56 cooperates with the position location module 18 to send location data indicating the location of the mobile phone 10.

The position location module 18 would cooperate with, for example, a global positioning satellite system (not shown), to provide some kind of location information to determine the geographical position of the mobile phone.

Last Usage Data

The status message module 56 may also send last usage data, such as when the mobile phone was used the last time (call, SMS, or maybe just the use of an application). This information is typically stored in the memory of the mobile phone 10.

This is useful in situations where the mobile phone is being tracked, for example, if the user does not remember where he/she left it. The second item tells whether someone has been using it.

Control Messages

In FIG. 2, the security and control module 28 has control message modules 50 that include a transfer of control messages module 62 and a control language module 64.

Transfer of Control Messages

In FIG. 2, the transfer of control messages module 62 controls the transfer of control messages between the user to the mobile phone 10 (FIG. 1).

The scope of the invention is not intended to be limited to any particular way of transferring the control message to the mobile phone 10. However, whatever system is used for transferring the control message to the mobile phone 10, the system must enable the average user to easily send the control message. This means that the user must have an easy access to the system which is used to send the message, and the operation for composing and sending the message must also be easy.

The Short Message System (SMS), which is known in the art, provides a natural choice or scheme for transferring control messages, but other message transferring systems are known in the art, including wireless internet connections.

Characteristics of an SMS interface include the following:

Any mobile phone with SMS capability can be used to send the control message.

The receiving mobile phone can receive the control message automatically whenever it is "on" and in contact with a network.

The transfer of control messages module 62 may be implemented using hardware, software or a combination thereof. A person skilled in the art would be able to implement the transfer of control messages module 62 without undue experimentation.

Control Language

In FIG. 2, the control language module 64 operates to control the language used to transfer messages between the user to the mobile phone 10 (FIG. 1). The control language is implemented for composing control messages. The control language is a simple one and resembles a natural language in order to make it easy to memorize.

The following is an example of a simple control language that may be used:

Commands and parameters are separated by nonprinting characters (space, new line etc.).

A command starts with the keyword SECURITY followed by the security code of the mobile phone. When a short message arrives, the control language module 64 always checks the beginning of the control message, and if a keyword with matching security code is found, it interprets the whole message and acts accordingly.

After the beginning keyword and security code, one command keyword (and its parameter if required) can be added. Examples of supported commands and a description thereof are listed in Table 1 as follows:

TABLE 1

| Keyword | Parameter | Description |
|---------|-----------|-------------|
| LOCK | — | Locks the mobile phone, displays "Phone is locked" message and a predefined phone number on screen. Allows calls to the number. |
| LOST | phone number | Locks the mobile phone, (optional) displays a "This phone is lost" message on screen. Allows calling one number, specified by the mobile phone number parameter, or the predefined one. |
| STOLEN | phone number (optional) | Locks the mobile phone, displays a "This phone is stolen" message on screen. Allows calling one number, specified by the mobile phone number parameter, or the predefined one. |
| UNLOCK | — | Unlocks the mobile phone so that it can be used normally. |
| INFO | phone number | Commands the mobile phone to send a status message to the number specified in the mobile phone number parameter. |

As an example, a command message containing the text "SECURITY 12345 LOST 02654321" would instruct the control language module 64 to display the lost phone message, to lock the mobile phone, and to allow calls to the phone number 02654321.

The control language module 64 may be implemented using hardware, software or a combination thereof. A person skilled in the art would be able to implement the control language module 64 without undue experimentation.

In one embodiment, the control messages would only be effective when the mobile phone 10 (FIG. 1) uses the owner's SIM. Therefore, other existing security mechanisms would be needed to achieve the best security.

The present invention improves current security schemes, for example, in the usual case when a mobile phone is lost when it is "on", so that anyone can use it until power runs out or the operator blocks it. The present invention can also help in those cases where the PIN query is off, although the SIM can then be used in other phones.

Scope of the Invention

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

I claim:

1. A method of displaying owner information for security applications in a secure mode operation of a mobile phone, comprising the steps of:

checking a SIM card;

displaying a PIN code query if the PIN code query is "on", receiving a user PIN code, and checking the PIN code; and either starting up the mobile phone so a user can operate the mobile phone normally if the SIM card is recognized as a mobile phone owner's SIM card known by the mobile phone and if the PIN code is successfully entered, or locking the mobile phone and displaying a phone display message with owner information if the code PIN query is cancelled.

2. A method according to claim 1, wherein the method further comprises the steps of:

requesting a security code from the user if the SIM card is not recognized as a mobile phone owner's SIM card known by the mobile phone, and the PIN code is entered correctly, and checking the security code; and either starting up the mobile phone so the user can operate the mobile phone normally if the security code is entered correctly, or locking the mobile phone and displaying the phone display message with owner information if a security code request is cancelled, or if a wrong security code is given.

3. A method according to claim 1, wherein the step of locking the mobile phone comprises the steps of:

only allowing a phone call to an owner's phone number displayed in the phone display message; and disabling any other use of the mobile phone, except for emergency calls.

4. A method according to claim 3, wherein the method includes requesting the owner information from the user and storing the owner information in the memory.

5. A method according to claim 1, wherein the method further comprises the steps of:

receiving a control message via a telecommunications signal from an owner of the mobile phone with a phone lost command for locking the mobile phone and displaying the phone display message.

6. A method according to claim 5, wherein the phone display message includes a phone locked display message containing the text "Phone is locked. Call the owner.", as well as an owner's telephone number stored in a memory of the mobile phone.

7. A method according to claim 5, wherein the control message includes an owner telephone number for displaying in the phone display message to reach the owner of the mobile phone.

8. A method according to claim 5, wherein the phone display message includes a phone lost display message containing the text "This phone is lost. Call the owner.", and an owner's telephone number that is provided in the control message.

9. A method according to claim 5, wherein the method includes the steps of:

switching the mobile phone off; and either restarting the mobile phone so the user can operate the mobile phone normally if the PIN code and security code are entered correctly, or locking the mobile phone if the PIN code and security code are not entered correctly, and displaying the phone display message as a phone lost display message containing the text "This phone is lost. Call the owner.", and an owner's telephone number that is provided in the control message.

10. A method according to claim 5, wherein the phone display message includes a phone lost display message containing the text "This phone is stolen. Call the owner.", and an owner's telephone number that is either stored in a memory of the mobile phone or provided in the control message.

11. A method according to claim 5, wherein the method includes the step of:

transferring the control message from the user using a short message system.

12. A method according to claim 11, wherein the step of transferring includes sending the control message with any mobile phone having the short message system.

13. A method according to claim 11, wherein the method includes the step of:

enabling the mobile phone to automatically receive the control message when the mobile phone is "on" and in contact with the network.

14. A method according to claim 5, wherein the method includes the step of:

using a control language for sending the control messages to the mobile phone that has commands and parameters separated by nonprinting characters.

15. A method according to claim 5, wherein the method includes the step of:

using a control language for sending the control message to the mobile phone that starts with a command having a keyword SECURITY followed by the security code of the mobile phone.

16. A method according to claim 5, wherein the method includes the steps of:

receiving a short message that is a part of the control message; and checking the mobile phone at the beginning of the short message, and if a keyword with a matching security code is found, then interpreting the control message and adapting the mobile phone accordingly.

17. A method according to claim 1, wherein the method further comprises the steps of:

receiving a phone status request from a remote source; and providing a status message with information about the mobile phone in response thereto.

18. A method according to claim 17, wherein the phone status request includes a phone number to which the status message is to be sent.

19. A method according to claim 17, wherein the status message includes information about a position location of the mobile phone.

20. A method according to claim 17, wherein the status message includes information about usage of the mobile phone, including data about a last usage.

21. A method according to claim 1, wherein the method includes storing owner information in a memory of the mobile phone.

22. A method according to claim 1, wherein the phone display message is a phone locked display message containing the text "Phone is locked. Call the owner.", and the owner's telephone number.

23. A method for locking a mobile phone, comprising the steps of:

receiving either a user security input signal and a personal identification input signal, or a telecommunication control signal, or a combination thereof, the telecommunication signal being a remote owner status request message signal via a telecommunication network from an owner of the mobile phone requesting status information;

locking the mobile phone in response thereto; and providing a status message signal via the telecommunications network to the owner with information about the mobile phone.

24. A method according to claim 23, wherein the user security input signal is either a SIM card signal or a security control signal, and the personal identification input signal is a PIN code signal.

25. A method according to claim 23, wherein the telecommunication control signal is a remote control message signal via a telecommunications network from an owner of the mobile phone.

26. A method according to claim 23, wherein the method includes the step of displaying a phone display message with owner information for contacting the owner of the mobile phone.

27. A method according to claim 26, wherein the method includes the step of displaying a phone locked display message with the text: "This phone is locked. Call the owner.", as well as the phone number of the owner of the mobile phone.

28. A method according to claim 26, wherein the method includes the step of displaying a phone lost display message with the text: "This phone is lost. Call the owner.", as well as the phone number of the owner of the mobile phone.

29. A method according to claim 26, wherein the method includes the step of displaying a phone stolen display message with the text: "This phone is stolen. Call the owner.", as well as the phone number of the owner of the mobile phone.

30. A method according to claim 23, wherein the remote phone message signal includes a phone number from the owner to which the status message signal should be sent.

31. A method according to claim 23, wherein the status message signal includes information about a position location of the mobile phone.

32. A method according to claim 23, wherein the status message signal includes information about usage of the mobile phone, including data about last usage.

33. A method according to claim 23, wherein the method includes the step of:

transferring the telecommunication control signal from the owner using a short message system.

34. A mobile phone for communicating in a telecommunications network, the mobile phone comprising:

security and control modules, responsive to either a user security input signal and a personal identification input signal, or a telecommunication control signal, or a combination thereof, for locking the mobile phone in response thereto, the security and control modules including a status message module that receives the telecommunication control signal in the form of a remote owner status request message signal from an owner of the mobile phone requesting status information, for providing a status message telecommunication signal to the owner with information about the mobile phone.

35. A mobile phone according to claim 34, wherein the user security input signal is either a SIM card signal or a security control signal, and the personal identification input signal is a PIN code signal.

36. A mobile phone according to claim 34, wherein the security and control modules include a remote-controlled secure mode module that receives the telecommunication control signal in the form of a remote control message signal via a telecommunications network from an owner of the mobile phone.

37. A mobile phone according to claim 34, wherein the security and control modules include an owner information display that displays a phone display message with owner information for contacting the owner of the mobile phone.

38. A mobile phone according to claim 37, wherein the owner information display includes a phone locked display message with the text: "This phone is locked. Call the owner.", as well as the phone number of the owner of the mobile phone.

39. A mobile phone according to claim 37, wherein the owner information display includes a phone display message with owner information and the text: "This phone is lost. Call the owner.", as well as the phone number of the owner of the mobile phone.

40. A mobile phone according to claim 37, wherein the owner information display includes a phone lost display message with the text: "This phone is stolen. Call the owner.", as well as the phone number of the owner of the mobile phone.

41. A mobile phone according to claim 34, wherein the status message telecommunication signal includes a phone number from the owner to which the status message telecommunication signal should be sent.

42. A mobile phone according to claim 34, wherein the status message telecommunication signal includes information about a position location of the mobile phone.

43. A mobile phone according to claim 34, wherein the status message telecommunication signal includes information about usage of the mobile phone, including data about last usage.

44. A mobile phone according to claim 34, wherein the security and control modules include a transfer of control messages module that transfers the telecommunication control signal from the owner using a short message system.

45. A method for remotely locking a mobile phone, comprising the steps of:

receiving a telecommunication control signal;

locking the mobile phone if the telecommunication control signal contains a control message with a phone stolen instruction therein;

requesting a security code from a user if a SIM card is not recognizer as a mobile phone owner's SIM card known by the mobile phone, and a PIN code is entered correctly, and checking a security code; and either starting up the mobile phone so the user can operate the mobile phone normally if the security code is entered correctly, or locking the mobile phone and displaying the phone display message with owner information if a security code request is cancelled, or if a wrong security code is given.

46. A method according to claim 45, wherein the step of locking the phone comprises the steps of:

only allowing a phone call to the owner's phone number displayed in the phone display message; and disabling any other use of the mobile phone, except for emergency calls.

47. A method according to claim 45, wherein the method further comprises the steps of:

receiving a control message from the owner of the mobile phone with a phone lost command for locking the mobile phone and displaying the phone display message in the form of a phone lost display message.

48. A method according to claim 45, wherein the method includes the step of displaying the phone display message in the form of a phone locked display message with the text: "This phone is locked. Call the owner.", as well as the phone number of the owner of the mobile phone.

49. A method according to claim 45, wherein the method includes the step of displaying the phone display message in the form of a phone lost display message with the text: "This phone is lost. Call the owner.", as well as the phone number of the owner of the mobile phone.

50. A method according to claim 45, wherein the method includes the step of displaying the phone display message in the form of a phone stolen display message with the text: "This phone is stolen. Call the owner.", as well as the phone number of the owner of the mobile phone.

51. A method according to claim 45, wherein the method includes the step of:

transferring the telecommunication control signal using a short message system.

52. A method for remotely locking a mobile phone comprising the steps of:

receiving a telecommunication control signal;

locking the mobile phone and displaying a phone display message with owner information for contacting an owner of the mobile phone if the communication control signal contains a control message with a phone stolen instruction therein;

receiving a phone status request via a telecommunications network from a remote source; and providing a status message via the telecommunications network with information about the mobile phone back to the remote source.

53. A method according to claim 52, wherein the phone status request includes a phone number to which the status message is sent.

54. A method according to claim 52, wherein the phone status message includes information about a position location of the mobile phone.

55. A method according to claim 52, wherein the status message includes information about usage of the mobile phone, including data about last usage.

56. A method for remotely locking a mobile phone comprising the steps of:

receiving a telecommunication control signal;

locking the mobile phone and displaying a phone display message with owner information for contacting an owner of the mobile phone if the telecommunication control signal contains a control message with a phone stolen instruction therein; and sending via the communication control signal a remote PIN code command to the mobile phone to request a PIN code from a user.

* * * * *

UNITED STATES PATENT AND TRADEMARK OFFICE
CERTIFICATE OF CORRECTION

PATENT NO.   : 6,662,023 B1
DATED        : December 9, 2003
INVENTOR(S)  : Helle It is certified that error appears in the above-identified patent and that said Letters Patent is hereby corrected as shown below:

Column 10,
Line 48, "recognizer" should be -- recognized --.

Column 11,
Line 28, "communication" should be -- telecommunication --.

Column 12,
Line 26, "communication" should be -- telecommunication --.

Signed and Sealed this

Tenth Day of August, 2004

JON W. DUDAS
*Acting Director of the United States Patent and Trademark Office*